Figure 1:
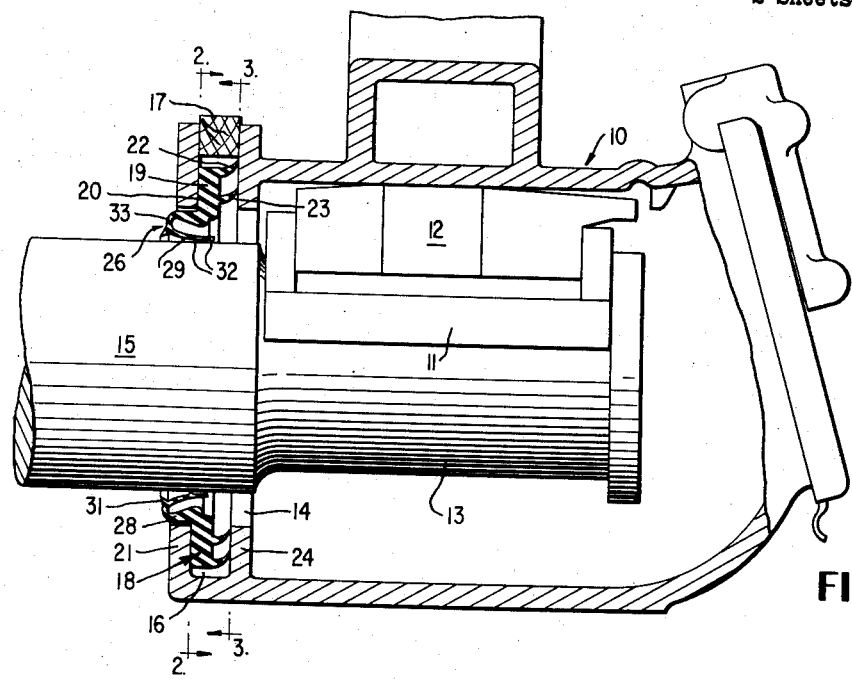

Dec. 18, 1962 L. L. JOHNSON 3,069,179
DUST GUARD AND SEAL FOR RAILROAD CAR JOURNAL BOXES
Filed March 6, 1961 2 Sheets-Sheet 1

INVENTOR.
LORAN L. JOHNSON
BY
B. P. Fishburne, Jr.
ATTORNEY

Dec. 18, 1962 L. L. JOHNSON 3,069,179
DUST GUARD AND SEAL FOR RAILROAD CAR JOURNAL BOXES
Filed March 6, 1961 2 Sheets-Sheet 2

INVENTOR.
LORAN L. JOHNSON
BY
ATTORNEY

United States Patent Office 3,069,179
Patented Dec. 18, 1962

3,069,179
DUST GUARD AND SEAL FOR RAILROAD CAR JOURNAL BOXES
Loran L. Johnson, Tulsa, Okla., assignor to Tulsa Railway Seal Manufacturers, Inc., Tulsa, Okla., a corporation of Oklahoma
Filed Mar. 6, 1961, Ser. No. 93,552
3 Claims. (Cl. 277—130)

The present invention relates to improvements in dust guards and seals for journal boxes of railroad cars and the like.

A primary object of the invention is to provide a dust guard and seal having novel resilient means for constant engagement with the so-called dry seat portion of the car axle, inwardly of the journal proper adjacent the inner end of the journal box.

Another important object is to provide novel and simplified means on the dust guard and seal for applying heavy pressure against one side of the dust guard well or slot to thereby effectively seal such side and prevent the entrance of foreign matter into the journal box and the escape of lubricant therefrom.

Another object is to provide a dust guard and seal including a flexible finned diaphragm portion of an improved design or configuration for sealing engagement with the dry seat portion of the car axle in all laterally adjusted positions of the latter relative to the journal box which is rigid with the car frame structure.

A further object is to provide means on the flexible diaphragm portion of the device for preventing rock particles, dust and the like from entering under the sealing lip of the diaphragm portion which rides upon the dry seat and contains its own lubrication.

Another object is to provide a journal box dust guard and seal formed entirely of rubber-like material which is highly resistant to wear, corrosion, etc., and entirely free of metallic parts or inserts and adapted to be molded as a unitary body.

Still another object is to provide a dust guard and seal which is visibly marked for ease of installation without mistake by the mechanic and which is substantially self-adjusting during operation as the car axle shifts somewhat with respect to the journal box.

Another object of the invention is to provide a dust guard and seal having a relatively heavy plate-like body portion for insertion in the dust guard well of the journal box to seal one face of the latter and a generally L-shaped offset diaphragm portion including a relatively thin flexible sealing lip portion to seal the dry seat of the car axle and an intermediate relatively thick portion extending axially of the dry seat portion and formed integral with the body portion to seal one corner of the opening leading into the interior of the journal box and dust guard well.

Other objects and advantages of the invention will be apparent to those skilled in the art during the course of the following detailed description.

Figure 2:
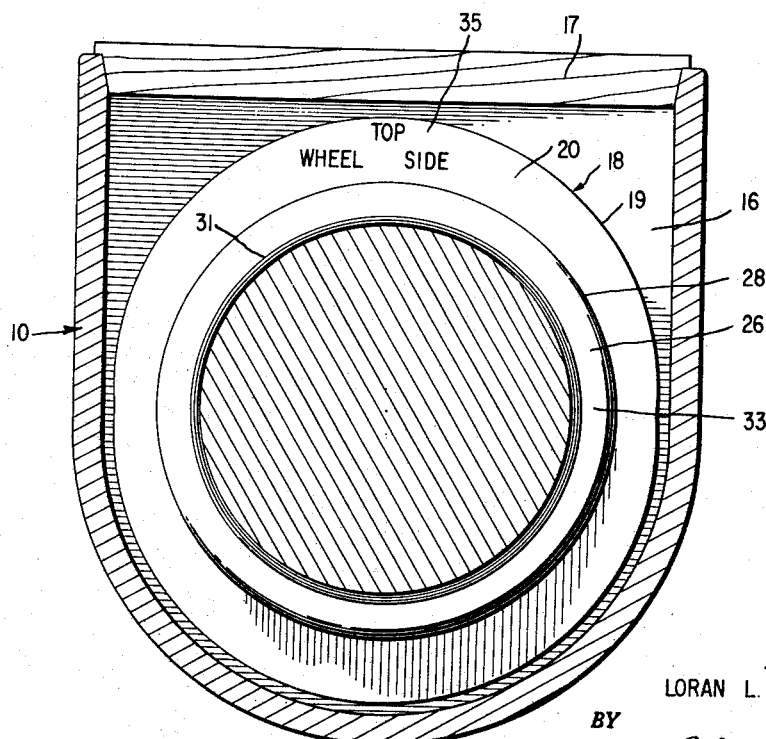
Figure 3:
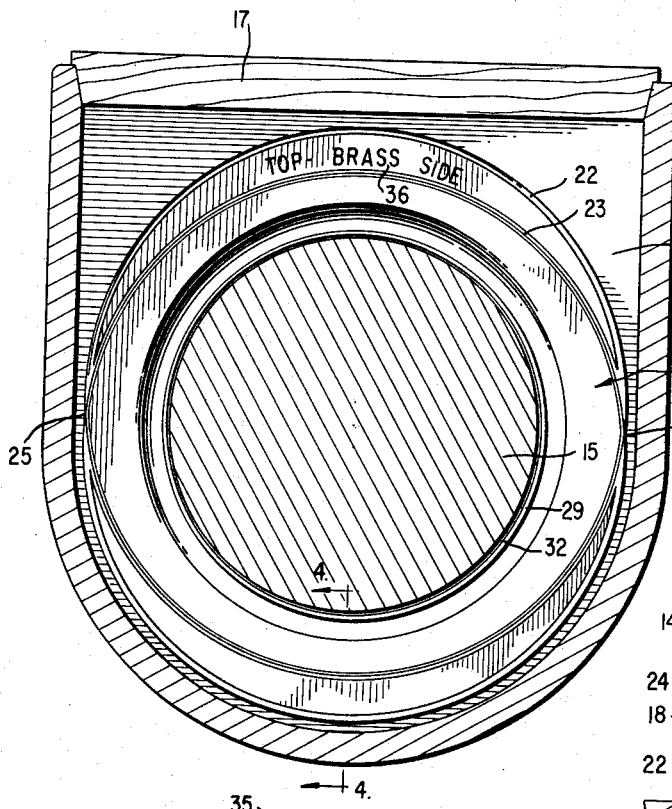
Figure 4:
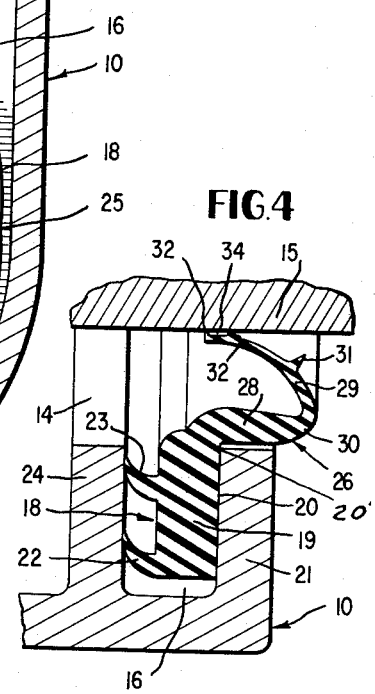
Figure 5:
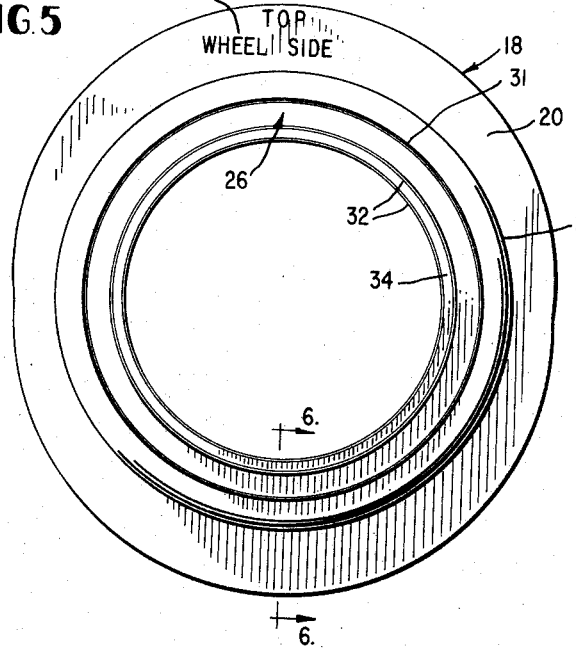
Figure 6:
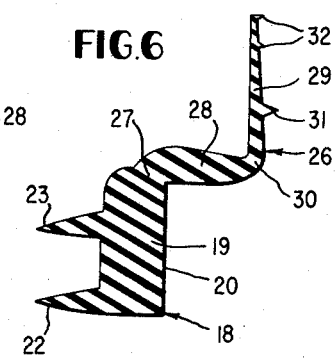

In the accompanying drawings forming a part of this application in which like numerals are employed to designate like parts throughout the same, FIGURE 1 is a central vertical section through the dust guard and seal installed according to the invention and through the journal box associated therewith, parts in elevation, FIGURE 2 is a transverse vertical section taken on line 2—2 of FIGURE 1, FIGURE 3 is a similar section taken on line 3—3 of FIGURE 1, FIGURE 4 is an enlarged fragmentary vertical section taken on line 4—4 of FIGURE 3, FIGURE 5 is a side elevation of the dust guard and seal in a relaxed or free condition, FIGURE 6 is an enlarged fragmentary vertical section taken on line 6—6 of FIGURE 5.

As employed in the specification and claims, the terms "inner" and "outer" and "inwardly" and "outwardly" are referenced to the longitudinal axis of the railroad car axle, the outer end of which terminates within the journal box 10 as shown in FIGURE 1.

In the drawings, wherein for the purpose of illustration is shown a preferred embodiment of the invention, the numeral 10 designates generally a conventional railroad car journal box containing in its upper portion the usual brass bearing 11 and bearing wedge 12. The journal box is adapted to receive and hold suitable lubricating material, as is well known, and the journal 13 of the railroad car axle is received within the interior of the journal box through an inner end opening 14 and bears the weight of the car through the medium of the brass bearing 11 and associated elements. The enlarged dry seat portion 15 of the car axle projects normally inside of the end opening 14 of the journal box, adjacent the usual top opening vertical well 16 or slot for the well-known wooden dust guard. The top of the dust guard well 16 may be closed by a plug or cap 17, commonly formed from a strip of wood.

According to the invention, there is provided an improved unitary dust guard and seal formed entirely of suitable rubber-like material and designated generally by the numeral 18. This dust guard and seal is constructed to effectively seal the interior of the dust guard well 16 and to also seal the dry seat portion 15 of the car axle, so that lubricant cannot escape from the journal box through the opening 14 or through the dust guard well and foreign matter cannot enter the interior of the journal box or pock or damage or corrode the dry seat portion 15 during operation.

The dust guard and seal 18 comprises a relatively thick and non-yielding web or body portion 19 which is somewhat elliptical in the vertical direction as installed in the dust guard well 16 as shown in FIGURES 1 and 5. The body portion 19 has a continuous relatively broad inner flat face 20 for firm sealing engagement with the inner wall 21 of the dust guard well 16, as shown. The flat face 20 is adapted to bear upon the inner face of the wall 21 around the entire periphery of the opening 14 and over a substantial flat area of the wall 21 to effectively seal the latter. To facilitate such sealing of the dust guard well 16, a pair of relatively heavy tapered fins 22 and 23 are formed upon the outer face of the heavy body portion 19 for engagement against the outer wall 24 of the dust guard well. These fins are not primarily for the purpose of sealing the outer wall 24, although they naturally provide some sealing effect, but are primarily intended when under compression and deformed or bent over as shown in FIGURE 1 to exert a heavy pressure upon the body portion 19 to press the flat face 20 of the latter into effectvie sealing engagement with the inner wall 21. The fins 22 and 23 as best shown in FIGURE 3 are continuous and annular and somewhat eccentrically disposed or offset vertically and the fins intersect and cross each other at 25 adjacent the vertical center of the dust guard and seal and in line with the axis of the journal 13. The fins 22 and 23 bear against the inner face of the wall 24 continuously around their entire circumferences so as to exert a heavy and even pressure inwardly upon the body portion 19 for the stated purpose.

The dust guard and seal 18 further comprises an integral relatively flexible tapered annular diaphragm portion 26 which is substantially L-shaped when relaxed and under no tension as shown clearly in FIGURE 6. The diaphragm portion 26 is integrally joined to the body portion 19 as at 27 adjacent the inner periphery of the latter, and the diaphragm portion 26 includes a relatively heavy annular sleeve section 28 extending axially inwardly of the flat face 20, substantially at right angles thereto, FIGURES 1 and 6, and adapted to lie within the opening 14 during use. The diaphragm portion 26 further embodies a much thinner and more flexible annular sealing lip 29, which in the relaxed position extends radially inwardly of the sleeve portion 28, at right angles thereto and parallel to the body portion 19, FIGURE 6. The sealing lip 29 is joined integrally at 30 to the sleeve portion 28, as shown. FIGURE 6 thus illustrates a typical cross section of the generally annular rubber-like dust guard and seal in the relaxed condition. Upon the inner face of the sealing lip 29 are formed a first relatively heavy annular fin 31 for a purpose to be described and a pair of substantially identical radially spaced relatively small annular fins 32 for a purpose to be described. The innermost fin 32 is adjacent the inner circumference of the sealing lip 29 and both of the fins 32 are spaced considerably from the fin 31, and the latter is spaced radially inwardly of the sleeve portion 28 as shown in FIGURE 6.

When installed for use, the flexible diaphragm portion 26 is deformed and assumes the approximate shape illustrated in FIGURE 1 and FIGURE 4. The relatively heavy sleeve portion 28 of the normally L-shaped diaphragm portion 26 remains generally at right angles to the body portion 19 and lies close to the bore of the opening 14 and projects axially inwardly through such opening toward the wheel, not shown. As shown in FIGURE 4, an effective seal is provided not only at the face 20, but at the corner 20′ adjacent the right angle bend between the body portion 19 and sleeve portion 28, thus completely sealing the entrance to the dust guard well 16. The sealing lip p-rtion 29, FIGURES 1 and 4, is reversely bent relative to the sleeve portion 28 and snugly surrounds the dry seat portion 15 of the car axle in firm sealing engagement therewith, FIGURE 1. The sealing lip portion 29 in use thus becomes substantially tubular and generally parallel to the sleeve portion 28 and spaced radially inwardly thereof in general parallelism to the dry seat portion 15 although diverging therefrom axially inwardly toward the annular U-shaped reversely bent connecting portion 33 which lies midway between sleeve portion 28 and sealing lip portion 29 in the installed condition.

In the installed condition shown in FIGURES 1 and 4, the smaller fins 32 constantly engage and form a tight seal with the dry seat portion 15, and suitable lubrication is adapted to be contained in the annular space 34 between the fins 32 and between the sealing lip portion adjacent these fins and the axle. This provision for lubrication eliminates excessive wear on the seal and heating of the same at all speeds of operation, and the sealing lip portion 29 and fins 32 effectively seal the dry seat portion 15 to prevent the escape of lubricant from the journal box through the opening 14 surrounding the dry seat portion 15.

As shown in FIGURES 2 and 4, the other fin 31 is now effectively positioned preferably in slightly spaced relation to the periphery of the dry seat portion 15 to prevent dust, chips of rock ballast or other such foreign material from entering under the sealing lip portion 29 near the sealing fins 32. Thus, the device when installed as shown in FIGURES 1 and 4 effectively seals against the dry seat portion 15 of the axle as well as the inner face of the dust guard well wall 21 as previously explained.

To facilitate installation by unskilled personnel without mistakes, the dust guard and seal 18 is visibly marked near its top as shown at 35 and 36 with the legends "top wheel side" and "top brass side." If the workman merely reads the legends 35 and 36 on the device, he cannot possibly have any difficulty in properly installing the same within the well 16 and upon the dry seat portion 16, as shown.

The design of the flexible and relatively long diaphragm portion 26 is such that the same effectively seals the dry seat portion 15 in all possible adjusted positions of the latter relative to the journal box 10 due to the natural movements of the axle with respect to the journal box and car frame.

It is to be understood that the form of the invention herewith shown and described is to be taken as a preferred example of the same, and that various changes in the shape, size and arrangement of parts may be resorted to, without departing from the spirit of the invention or the scope of the subjoined claims.

Having thus described my invention, I claim:

1. A dust guard and seal for a railroad car journal box having an end opening receiving the dry seat portion of the car axle and a dust guard well at right angles to said opening and intersecting the same, said dust guard and seal comprising a generally annular relatively thick plate-like body portion disposed within said well and having a radially wide flat face on one side thereof abutting the inner side wall of said well over a substantial area of the latter, a pair of substantially annular eccentrically arranged resilient fins on the other side of said body portion yieldably engaging the outer side wall of said well and exerting pressure upon said body portion axially to hold said flat face in tight sealing engagement with said inner wall of the well, an annular relatively thin and flexible diaphragm portion secured integrally to the inner periphery of said body portion and surrounding said dry seat portion and disposed within said opening and being reversely bent axially during use to provide a U-shaped annular bight portion near the mouth of said opening, an axial sleeve portion near the periphery of said opening and a generally axial sealing lip portion adjacent the periphery of the dry seat portion and snugly surrounding the latter within said opening, radially inwardly projecting annular sealing fins upon the sealing lip portion directly engaging said dry seat portion to effectively seal the latter, and an annular axially inclined deflector fin secured to the sealing lip portion adjacent said bight portion in surrounding relation to the dry seat portion to prevent foreign particles from entering under the sealing lip portion and thereby protecting the dry seat portion.

2. A dust guard and seal for railroad car journal boxes and formed entirely of rubber-like material and being unitary and comprising a relatively thick plate-like generally annular body portion having a flat face on one side thereof, generally annular heavy fins formed upon the opposite side of the body portion and bearing against the adjacent side wall of the dust guard well and exerting heavy pressure toward said flat face to press the latter into sealing engagement with the other face of the dust guard well, a sleeve portion of less thickness than the body portion integrally secured to the body portion and disposed axially within the opening of the journal box substantially at right angles to the body portion and forming with the body portion a substantially square corner having tight sealing engagement with the corner of the adjacent side wall of the dust guard well, a relatively thin flexible sealing lip portion carried by the sleeve portion and integral therewith and reversely bent upon the sleeve portion and spaced therefrom in use and having sealing fin means snugly engaging the dry seat portion of the car axle to seal the same around its entire circumference, and an annular deflector fin carried by the sealing lip portion between the last-named sealing fin means and said sleeve portion and arranged close to said dry seat portion and serving to deflect rock particles and the like away from the dry seat portion and said fin means of the sealing lip portion.

3. A dust guard and seal for a railroad car journal box having an inner end opening receiving the dry seat portion of the car axle and a dust guard well at right angles to said opening and intersecting the same, said dust guard and seal comprising a generally annular relatively thick and inflexible plate-like body portion disposed within said well and having one radially wide flat face on one side thereof abutting one inner face of said well over a substantial area of the latter, a pair of substantially annular eccentrically arranged resilient heavy fins on the other side of said body portion yieldably engaging the other inner face of said well and exerting heavy pressure upon said body portion axially to hold said flat face in tight sealing engagement with said one inner face of the well, an annular sleeve portion of lesser thickness than said body portion but having substantial thickness integrally secured to the body portion and disposed axially within the opening of the journal box substantially at right angles to the body portion and forming therewith a substantially square corner during use having sealing engagement with the corner of the adjacent side wall of said well, and a relatively thin flexible annular sealing lip portion integrally secured to the sleeve portion and carried thereby and reversely bent upon the sleeve portion and spaced therefrom radially during use and having sealing fin means snugly engaging the dry seat portion of the car axle to seal the same around its entire circumference.

References Cited in the file of this patent
UNITED STATES PATENTS

| | | |
|---|---|---|
| 2,080,180 | Stevens | July 27, 1937 |
| 2,692,783 | Foss | Oct. 26, 1954 |
| 2,945,708 | Stephens | July 19, 1960 |